United States Patent
Nakamura et al.

[15] 3,674,763

[45] July 4, 1972

[54] PROCESS FOR CURING FLUOROELASTOMER

[72] Inventors: Naoya Nakamura; Miyata Yasuo, both of Osaka, Japan

[73] Assignee: Daikin Kogyo Co., Ltd., Osaka, Japan

[22] Filed: Dec. 28, 1970

[21] Appl. No.: 102,189

[30] Foreign Application Priority Data

Dec. 30, 1969 Japan..................................44/1836

[52] U.S. Cl.................260/87.7, 117/116 UT, 117/139.5 A, 117/161 UZ, 260/80.77, 260/80.8, 260/87.5 A
[51] Int. Cl...................C08f 15/06, C08f 15/40, C08f 27/08
[58] Field of Search..............260/87.5 A, 87.5 B, 87.7, 92.1, 260/80.77; 117/161 UZ, 161 UT

[56] References Cited

UNITED STATES PATENTS

| | | | |
|---|---|---|---|
| 3,432,340 | 3/1969 | Mathis | 117/132 |
| 3,467,636 | 9/1969 | Nersasian | 260/80.77 |
| 3,524,836 | 8/1970 | Barney | 260/80.77 |
| 3,557,034 | 1/1971 | Thomas | 260/30.8 |
| 3,560,595 | 2/1971 | Phillips | 260/900 |

OTHER PUBLICATIONS

Moran, A. L. et al., Industrial and Eng. Chem., 51, 831– 2 (1959)

*Primary Examiner*—Joseph L. Schofer
*Assistant Examiner*—C. A. Henderson, Jr.
*Attorney*—Stevens, Davis, Miller & Mosher

[57] ABSTRACT

A process for curing fluoroelastomer by curing a fluoroelastomer on heating in the presence of both N,N'-dicinnamylidene-1,6-hexylenediamine and para-phenylenediamine as a curing agent. By the use of both N,N'-cinnamylidene-1,6-hexylenediamine and para-phenylenediamine can give an extremely faster curing velocity than that in case of using each alone.

11 Claims, No Drawings

PROCESS FOR CURING FLUOROELASTOMER

The present invention relates to a novel process for curing fluoroelastomer, and particularly to a process for preparing fluoro-rubber having a smaller compression set without any drop of the elastic property.

Hitherto, it has been known to obtain fluoro-rubber by curing a fluoroelastomer on heating in the presence of a curing agent. It has been required to obtain fluoro-rubber which has a smaller compression set as well as a sufficient elastic property. By the use of any curing agent in conventional process for curing fluoroelastomer, however, it tends to increase its compression set when elastic property is guaranteed and, on the other hand, it tends to disappear its elastic property when compression set is suppressed. Therefore, it is earnestly expected to find out a process for curing fluoroelastomer capable of giving a fluoro-rubber having a smaller compression set without any drop of the elastic property.

Recently, it has been also provided to prepare a fluoro-rubber having smaller compression set by blending a specific resin to the fluoroelastomer. However, though the process is somewhat effective for decreasing compression set, it tends to lose elastic property and therefore it is not necessarily preferable.

An object of the present invention is to provide a novel process for curing fluoroelastomer.

Another object of the invention is to provide a process for preparing fluoro-rubber having a smaller compression set without any drop of the elastic property.

Further object of the invention is to provide a process for curing fluoroelastomer with excellent curing velocity.

The other objects will be apparent from the description hereinafter and claims.

These objects have now been accomplished by curing a fluoroelastomer on heating in the presence of both N,N'-dicinnamylidene-1,6-hexylenediamine and para-phenylenediamine as a curing agent.

In the present invention, it is essential to use both N,N'-dicinnamylidene-1,6-hexylenediamine and paraphenylenediamine as a curing agent, and thereby the excellent effects as described above can be obtained. In case N,N'-dicinnamylidene-1,6-hexylenediamine alone is used, it can be scarcely expected to make the compression set decrease without any drop of the elastic property. On the other hand, in case para-phenylenediamine alone is used, it is also difficult to make the compression set decrease without any drop of the elastic property, and further it requires too long curing period and the foaming often occurs. Therefore, they are not practical.

In carrying out the process of the present invention, the fluoroelastomers to be cured may be selected from one in a wide scope. One example of the elastomer is a copolymer of vinylidene fluoride and fluoro-olefin. As a fluoroolefin there may be used one or more of hexafluoropropylene, pentafluoropropylene, trifluoroethylene, trifluorochloroethylene tetrafluoroethylene, vinyl fluoride, and the like. The suitable ratio of vinylidene fluoride unit and fluoroolefin unit in the copolymer is employed from the range of 10:90 to 95:5 by weight. Further, there may be effectively used a polymer obtained by polymerizing both vinylidene fluoride and fluoro-olefin together with a small amount of vinyl compound, olefinic compound, diene compound, $\alpha$, $\beta$-ethylenically unsaturated carboxylic acid, or the like.

N,N'-dicinnamylidene-1,6-hexylenediamine and paraphenylenediamine are employed in a ratio of 0.1 to 5 parts, respectively, totally 0.5 to 7 parts by weight to 100 parts by weight of fluoroelastomer. Particularly, N,N'-dicinnamylidenediamine is 0.3 to 4 parts by weight and paraphenylenediamine is 0.3 to 3 parts by weight, totally 1 to 5 parts by weight to 100 parts by weight of fluoroelastomer. In case that the amount of either of them is less than 0.1 part by weight, the curing effect can not be obtained thoroughly. In case that the amount of either of them is more than 5 parts by weight, the elastic property is deteriorated and the plasticity is increased. The preferable ratio of N,N'-cinnamylidene-1,6-hexylenediamine and paraphenylenediamine is 30:70 to 95:5 by weight. If necessary, there may be admixed fillers or reinforcing fillers, e.g. carbon black, silica, clay, diatom earth, talc, and the like, and acid acceptors, e.g. MgO, PbO, CaO, ZnO–Pb(HPO$_3$)$_2$, in the composition to be cured.

In case of employing para-phenylenediamine alone, the curing velocity is very low and therefore it can not be used as a curing agent of fluoroelastomer, and further in case of employing N,N'-dicinnamylidene-1,6-hexylenediamine alone, the curing velocity is also rather low. Nevertheless, it has now been unexpectedly found that when both para-phenylenediamine and N,N'-dicinnamylidene-1,6-hexylenediamine are employed in an amount of the range above-mentioned, the curing can be accomplished extremely faster than that in case of employing each alone and further the excellent valuable physical properties are not deteriorated, as shown in Table 1.

TABLE 1

| N,N'-dicinnamylidene-1,6-hexylidenediamine (% by weight) | P-phenylene diamine (% by weight) | Relative curing velocity |
|---|---|---|
| 100 | 0 | 20.3 |
| 92 | 8 | 7.7 |
| 86 | 14 | 2.7 |
| 83 | 17 | 3.2 |
| 78 | 22 | 2.5 |
| 66 | 34 | 2.2 |
| 50 | 50 | 1.7 |
| 32 | 68 | 2.1 |
| 16 | 84 | 32.0 |

(Note) Relative curing velocity means the difference between 18 point rise and 3 point rise in Mooney scorch value; i.e. the viscosity by Mooney scorch is graphed with a progress of the time. The viscosity lowers with the progress of curing to its minimum point and then rised. The difference ($\Delta t_{18} - \Delta t_3$) of the time ($\Delta t_3$) when the Mooney scorch value rises 3 points from the minimum point and the time ($\Delta t_{18}$) when it rises 18 points is calculated and then used as the relative curing velocity. As the value is smaller, the larger curing velocity is obtained.

The Mooney scorch value is determined as follows: 100 g. of terpolymer is mixed with 20 g. of medium thermal carbon, 20 g. of magnesium oxide and 3 g. of a mixture of N,N'-dicinnamylidene-1,6-hexylenediamine and para-phenylenediamine, and they are mill-mixed. From the resultant a test piece having a diameter of 45 mm. and a thickness of about 10 mm. is made. The Mooney scorch value of the test piece is measured by a Mooney viscometer (an air working type; made by Shimazu Seisakusho Ltd.). The method of measurement is carried out in accordance with the provision of JIS K 6,300; at a temperature of 121° C., by using a rotor having a diameter of 30.48 mm. and a thickness of 5.54 mm.

Without departing from the spirit of the present invention, there may be also admixed a small amount of one or more conventional curing agents, and further plastisizers and colorants.

Thus obtained composition can be cured according to a conventional method. In an example, after roll milling the composition is subjected to the press cure (initial cure) by heating in a mold under compression at an elevated temperature, and then to the oven cure (post cure). The press cure may be carried out under the condition of a temperature of 100° to 180° C., a period of 10 to 180 minutes and a pressure of 20 to 100 kg./cm²., and the oven cure may be carried out under the condition of a temperature of 150° to 250° C. and a period of 5 to 30 hours. In other example, the composition is directly injection- or extrusion-molded and then heated to obtained curing. In further example, the composition is dissolved or dispersed into one or more solvents, such as ketones, e.g. methyl ethyl ketone, acetone, cyclohexanone, and ethers, e.g. methyl ethyl ether, diethyl ether, dioxane, tetrahydrofuran, and applied on a surface of shaped articles, such as paper, fiber, film, sheet, plate, tube, pipe, tank, and large-sized vessel (made of cellulose, synthetic resin, metal, etc.), and then the resultant shaped article is heated to obtain curing.

The fluoro-rubber obtained by the process of the present invention has an excellent heat-resistance, low temperature resistance and chemical resistance, the same as a fluoro-rubber obtained by using a conventional curing agent, and furthermore in accordance with the present invention, there can be obtained an excellent effect which is the above-mentioned and can not be attained by any conventional process. Therefore, the present invention is remarkably valuable in industrial and economical points.

The present invention is illustrated in detail by the following example.

EXAMPLE

To 100 parts by weight of vinylidene fluoride-hexafluoropropylene-tetrafluoroethylene terpolymer (the ratio of each monomer units is 56.1:22.4:21.5 by weight) were added 20 parts by weight of medium thermal carbon, 20 parts by weight of magnesium oxide, 0.5 to 2.5 parts by weight of N,N′-dicinnamylidene-1,6-hexylenediamine and 0.5 to 2.0 parts by weight of para-phenylenediamine, successively, and the mixture was milled at a room temperature on a rubber roll and then allowed to stand over night to proceed aging.

After re-milling, the resultant mixtures are put into a mold and then subjected to the press cure by heating at 150° C. under a pressure of 55 kg./cm². for 30 minutes to mold a sheet and block, respectively.

Then, they are taken out of the mold, and subjected to the oven cure by heating in a furnace at 200° C. for 24 hours, respectively.

On the obtained sheets of fluoro-rubber, there are measured a 100 % modulus, tensile strength, elongation and hardness. On the obtained blocks of fluoro-rubber, there is measured a compression set.

Furthermore, the air aging test of the said sheets were carried out by heating at 315° C. in a furnace for 16 hours, and then there are measured a tensile strength, elongation and hardness.

As Control 1, the procedure of Example was repeated except that 3 parts by weight of N,N′-dicinnamylidene-1,6-hexylenediamine alone were employed as a curing agent, and as Control 2, the procedure of Example was repeated except that 3 parts by weight of para-phenylenediamine alone were employed as a curing agent.

The test results are shown in Tables 2 to 3.

Note 1. Compression set is calculated on the basis of a thickness of sample according to the following equation:

$$\text{Compression set (percent)} = \left(1 - \frac{t_1}{t_0}\right) \times 100$$

wherein $t_0$: thickness before compression
$t_1$: thickness after compression

The thickness of sample is measured by using a thickness gauge for rubber (Peacock type; made by Kabushiki Kaisha Ozaki Seisakusho).

The tested sample is prepared as follows: the sample (block) after the oven cure is maintained at 200° C. under a compressing condition of 25 percent in a furnace for 24 hours, taken out of the furnace and then allowed to stand at a room temperature for 30 minutes, according to the provision of JIS K 6301.

2. Hardness is shown by a value measured by using a hardness tester (Asker type; made by Kobunshi Keiki Kabushiki Kaisha) which is a spring type tester according to the provision of JIS K 6301.

3. 100 percent modulus (kg./cm²), tensile strength (kg./cm².) and elongation (%) are measured by using a universal tensile tester (Tensilon type; made by Toyo Sokuki Kabushiki Kaisha).

The sample to be measured is prepared in a shape of dumbbell by punching a sample sheet, according to the provision of JIS K 6301.

TABLE 3

| Para-phenylenediamine (part) | N,N′-dicinnamylidene-1,6-hexylenediamine (part) | Hardness (Hs) | Tensile Strength (kg./cm².) | Elongation (%) |
|---|---|---|---|---|
| 0.5 | 2.5 | 91 | 106 | 102 |
| 1.0 | 2.0 | 91 | 110 | 95 |
| 1.5 | 1.5 | 92 | 113 | 90 |
| 2.0 | 1.0 | 91 | 112 | 80 |
| 0 | 3.0 | 91 | 91 | 110 |

(Note) The above data are those after air aging test (315° C. × 16 hours).

From the result of Table 3, it is understood that in the fluoroelastomer cured by the process of the present invention its mechanical properties do not decrease even after heating at a high temperature for a long time.

What we claim is:

1. A process for curing fluoroelastomers comprising curing a fluoroelastomer by heating until curing is obtained in the presence of a curing agent consisting of (1) N,N′-dicinnamylidene-1,6-hexylenediamine and (2) paraphenylenediamine wherein both are used in a ratio of 0.1 to 5 parts, respectively, totally 0.5 to 7 parts by weight to 100 parts by weight of the fluoroelastomer.

2. The process of claim 1, wherein the said fluoroelastomer is a copolymer of vinylidene fluoride and fluoro-olefin.

3. The process of claim 2, wherein a ratio of vinylidene fluoride unit and fluoro-olefin unit in the said copolymer is one selected from the range of 10:90 to 95:5 by weight.

4. The process of claim 2, wherein the said fluoro-olefin is at least one member selected from the group consisting of hex-

TABLE 2

| | p-Phenylene diamine (part) | N,N′-dicinnamylidene-1,6-hexylenediamine (part) | Mooney scorch at 21° C. | | | | | Compression set (percent) | Hardness (Hs) | 100% modulus (kg./cm.²) | Tensile strength (kg./cm.²) | Elongation (percent) |
|---|---|---|---|---|---|---|---|---|---|---|---|---|
| | | | Minimum | Minutes to | | | | | | | | |
| | | | | 3 point rise | 10 point rise | 18 point rise | $t_{18-3}$ | | | | | |
| Example | 0.5 | 2.5 | 62 | 10.5 | 13.2 | 15.0 | 4.5 | 37.0 | 78 | 61 | 211 | 220 |
| | 0.75 | 2.5 | 69 | 6.8 | 8.4 | 9.4 | 2.6 | 33.6 | 79 | 69 | 191 | 210 |
| | 0.75 | 2.0 | 70 | 8.5 | 9.8 | 10.9 | 2.4 | 36.8 | 78 | 50 | 185 | 220 |
| | 1.0 | 2.0 | 64 | 8.4 | 10.0 | 11.0 | 2.6 | 33.1 | 78 | 65 | 203 | 205 |
| | 1.5 | 1.5 | 66 | 8.0 | 9.6 | 10.6 | 2.6 | 28.6 | 79 | 70 | 185 | 200 |
| | 1.5 | 2.5 | | | | | | 31.5 | 82 | 90 | 197 | 140 |
| | 2.0 | 1.0 | 66 | 9.8 | 12.8 | 13.5 | 3.7 | 28.2 | 78 | 92 | 182 | 150 |
| Control: | | | | | | | | | | | | |
| 1 | 0 | 3.0 | 66 | 34.5 | 44.0 | 55.0 | 20.5 | 47.9 | 80 | 59 | 186 | 270 |
| 2 | 3.0 | 0 | | | | | | (¹) | | | | |

¹ Foaming by oven cure.

afluoropropylene, pentafluoropropylene, trifluroethylene, trifluorochloroethylene, tetrafluoroethylene and vinyl fluoride.

5. The process of claim 1, wherein the said N,N'-dicinnamylidene-1,6-hexylenediamine is employed in a ratio of 0.3 to 4 parts, the said para-phenylenediamine is employed in a ratio of 0.3 to 3 parts and totally 1 to 5 parts by weight to 100 parts by weight of the fluoroelastomer.

6. The process of claim 1, wherein the said N,N'-dicinnamylidene-1,6-hexylenediamine and para-phenylenediamine are employed in a ratio of 30:70 to 95:5 by weight.

7. The process of claim 1, wherein a composition comprising the said fluoroelastomer and the said curing agent is subjected to roll milling, the press cure by heating in a mold under compression at an elevated temperature, and then to the oven cure.

8. The process of claim 7, wherein the said press cure is carried out under a condition of a temperature of 100° to 180° C., a period of 10 to 180 minutes and a pressure of 20 to 100 kg./cm²., and the said oven cure is carried out under a condition of a temperature of 150° to 250° C. and a period of 5 to 30 hours.

9. The process of claim 1, wherein a composition comprising the said fluoroelastomer and the said curing agent is dissolved or dispersed into a solvent and applied on a surface of shaped article, and then the resultant shaped article is heated to obtain curing.

10. The process of claim 9, wherein the said solvent is at least one member selected from the group consisting of methyl ethyl ketone, acetone, cyclohexanone, methyl ethyl ether, diethyl ether, dioxane and tetrahydrofuran.

11. The process of claim 10, wherein the said shaped article is at least one member selected from the group consisting of paper, fiber, film, sheet, plate, tube, pipe, tank and large-sized vessel.

* * * * *

PO-1050
(5/69)

UNITED STATES PATENT OFFICE
CERTIFICATE OF CORRECTION

Patent No. 3,674,763            Dated July 4, 1972

Inventor(s) NAKAMURA et al

It is certified that error appears in the above-identified patent and that said Letters Patent are hereby corrected as shown below:

Column 3, line 75, for $$\text{"Compression set (percent)} = \left(1 - \frac{t_1}{t_0}\right) \times 100 \text{ "}$$

read:

$$-- \text{ Compression set (\%)} = \frac{t_0 - t_1}{t_0 - t_2} \times 100 \quad --$$

Column 4, after line 2 and before line 3, insert:

-- $t_2$: thickness of the spacer bar used. --

Signed and sealed this 3rd day of April 1973.

(SEAL)
Attest:

EDWARD M. FLETCHER, JR.
Attesting Officer

ROBERT GOTTSCHALK
Commissioner of Patents